(12) United States Patent
Chiu

(10) Patent No.: US 6,679,388 B1
(45) Date of Patent: Jan. 20, 2004

(54) FOLDABLE HANGING DEVICE

(76) Inventor: Ming-Sung Chiu, No. 835, Ho-Ping Road, Pa-Te City, Tao-Yuan Hsien (TW)

( * ) Notice: Subject to any disclaimer, the term of this patent is extended or adjusted under 35 U.S.C. 154(b) by 0 days.

(21) Appl. No.: 10/309,696

(22) Filed: Dec. 3, 2002

(51) Int. Cl.[7] .................................................. B60R 9/00
(52) U.S. Cl. ........................................ 211/22; 248/170
(58) Field of Search ......................... 211/22; 248/125.7, 248/125.8, 125.9, 165, 166, 167, 170, 176.1

(56) References Cited

U.S. PATENT DOCUMENTS

| | | | |
|---|---|---|---|
| 5,086,930 A | * | 2/1992 | Saeks ........................... 211/17 |
| 5,320,227 A | * | 6/1994 | Minoura ........................ 211/22 |
| 5,492,228 A | * | 2/1996 | Botkin .......................... 211/85.7 |
| 5,642,820 A | * | 7/1997 | Angeles ........................ 211/103 |
| 5,690,260 A | * | 11/1997 | Aikins et al. ................. 224/505 |
| 5,842,581 A | * | 12/1998 | Graefe .......................... 211/17 |
| 5,871,185 A | * | 2/1999 | Phillips et al. ............... 248/167 |

* cited by examiner

Primary Examiner—Ramon O. Ramirez

(57) ABSTRACT

A hanging device includes a retractable post and a leg assembly including a short leg and two long legs fixed to a lower end of the post. At least one set of support rod assembly is fixed to the post and two support rods which may be positioned in horizontal positions are provided to support bicycles thereon.

13 Claims, 7 Drawing Sheets

FOLDABLE HANGING DEVICE

FIELD OF THE INVENTION

The present invention relates to a hanging device that can be foldable and includes a plurality of support rods on which bicycles can be supported.

BACKGROUND OF THE INVENTION

Conventionally, bicycles are parked outside of the house and usually locked by a variety of locks. Nevertheless, because the bicycles are light in weight, they can be easily taken away by thieves without any difficulty. Therefore, owners often carry their bicycles to their apartments and park the bicycles in rooms or on the patio. The bicycles occupy a lot of space which is limited in an apartment and this becomes a crucial problem if there are more than two bicycles for the owners of the apartment.

The present invention intends to provide a hanging device which occupies limited space and has a lot of pivotable support rods on which bicycles are convenient hanged.

SUMMARY OF THE INVENTION

In accordance with one aspect of the present invention, there is provided a hanging device which comprises a post and a leg assembly fixed to a lower end of the post. The leg assembly includes at least three pivotable legs which include at least one short leg. Each of the three legs has a bending portion. At least one set of support rod assembly is fixed to the post and at least one support rod is pivotably connected to the one set of support rod assembly. The primary object of the present invention is to provide a hanging device that is foldable so as to occupy only a limited space for the bicycles to be hanged in an upright direction.

The present invention will become more obvious from the following description when taken in connection with the accompanying drawings which show, for purposes of illustration only, a preferred embodiment in accordance with the present invention.

DETAILED DESCRIPTION OF THE INVENTION

Figure 1:
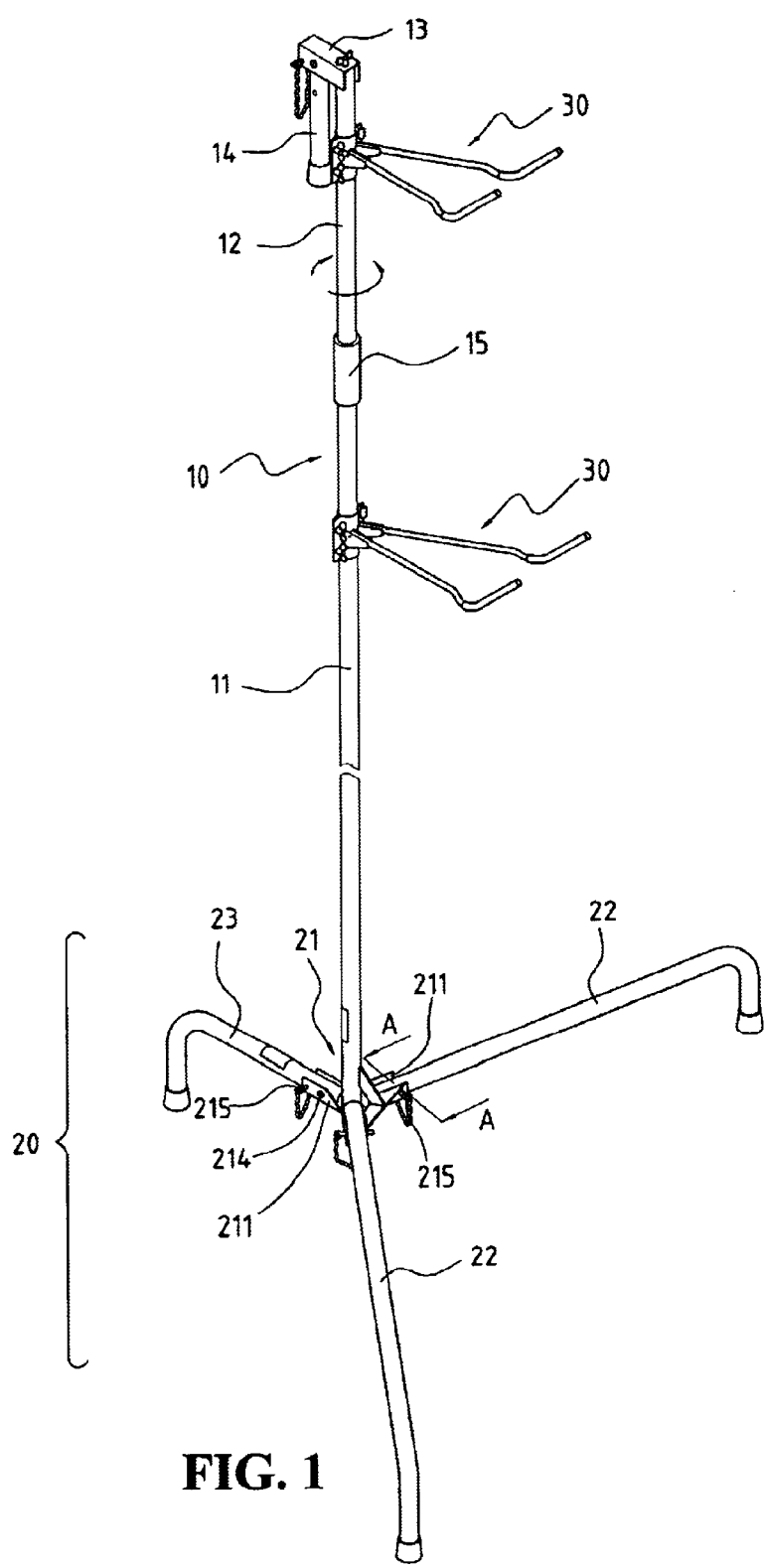
FIG. 1 is a perspective view to show the hanging device of the present invention.
Figure 2:
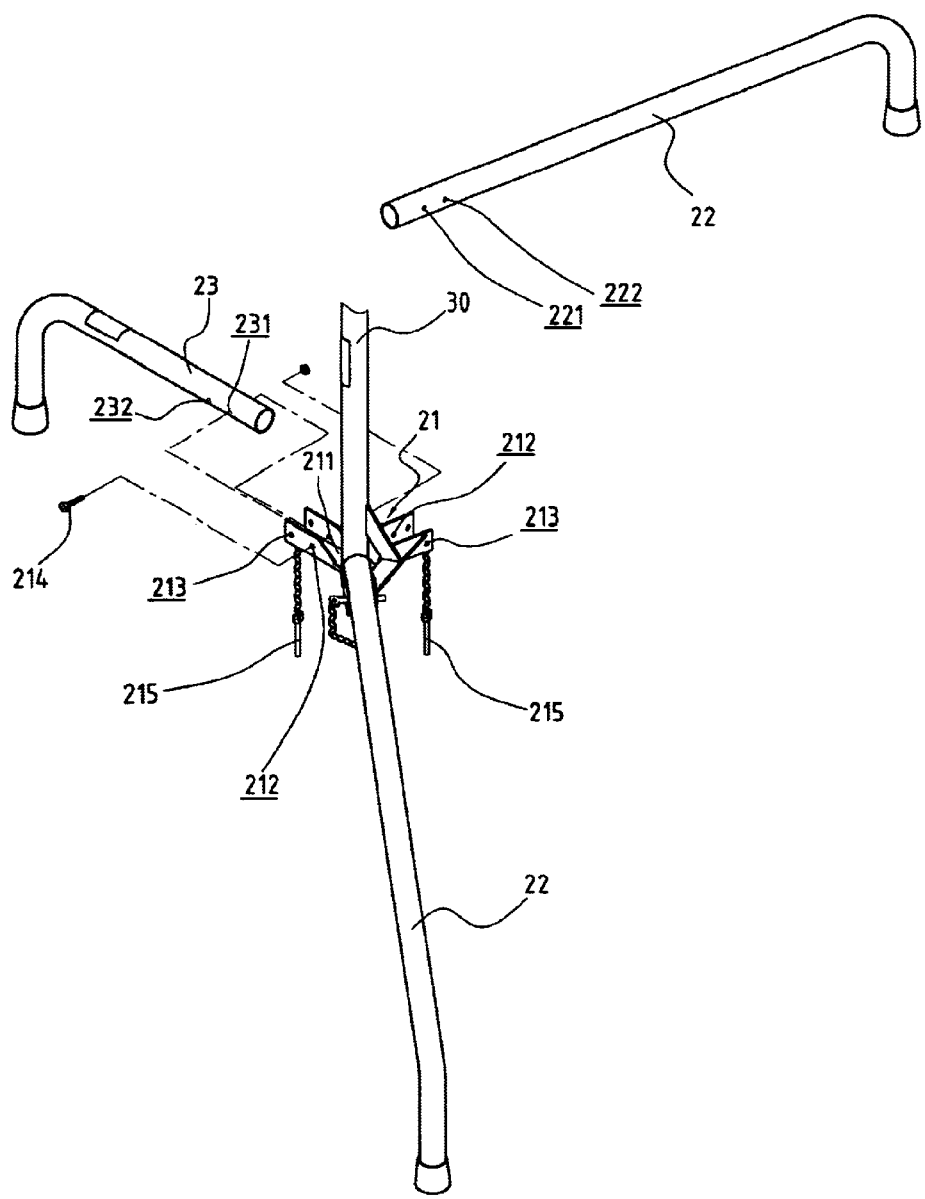
FIG. 2 is an exploded view to show the leg assembly of the hanging device of the present invention.
Figure 3:
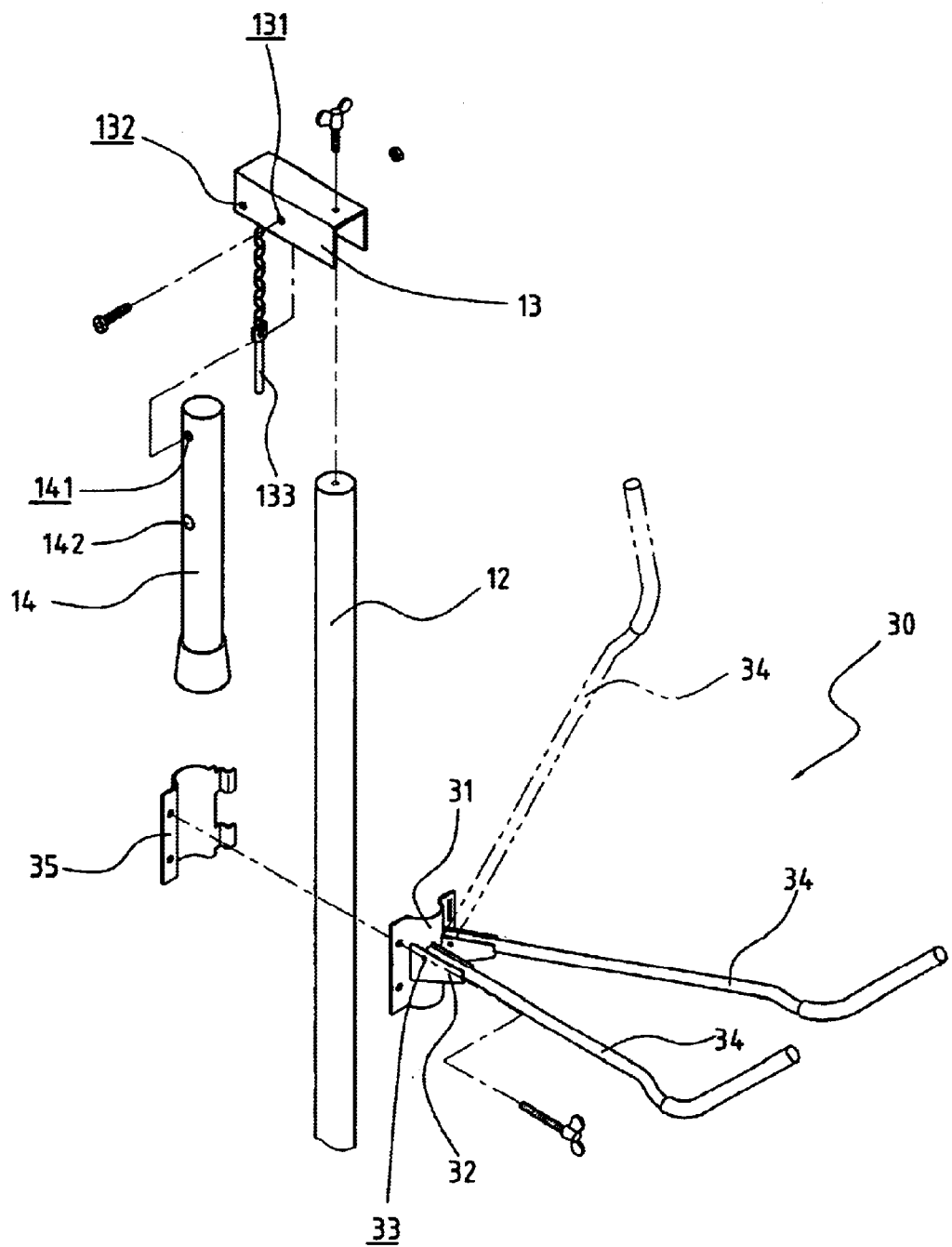
FIG. 3 is an exploded view to show the support rod assembly of the hanging device of the present invention.

Referring to FIGS. 1 to 3, the hanging device of the present invention comprises a post 10 which includes a first tube 11 and a second tube 12 which is retractably received in the first tube 11. A control collar 15 employing a cam device (not shown) is connected to the first tube 11 so as to control the positioning of the second tube 12.

Figure 7:
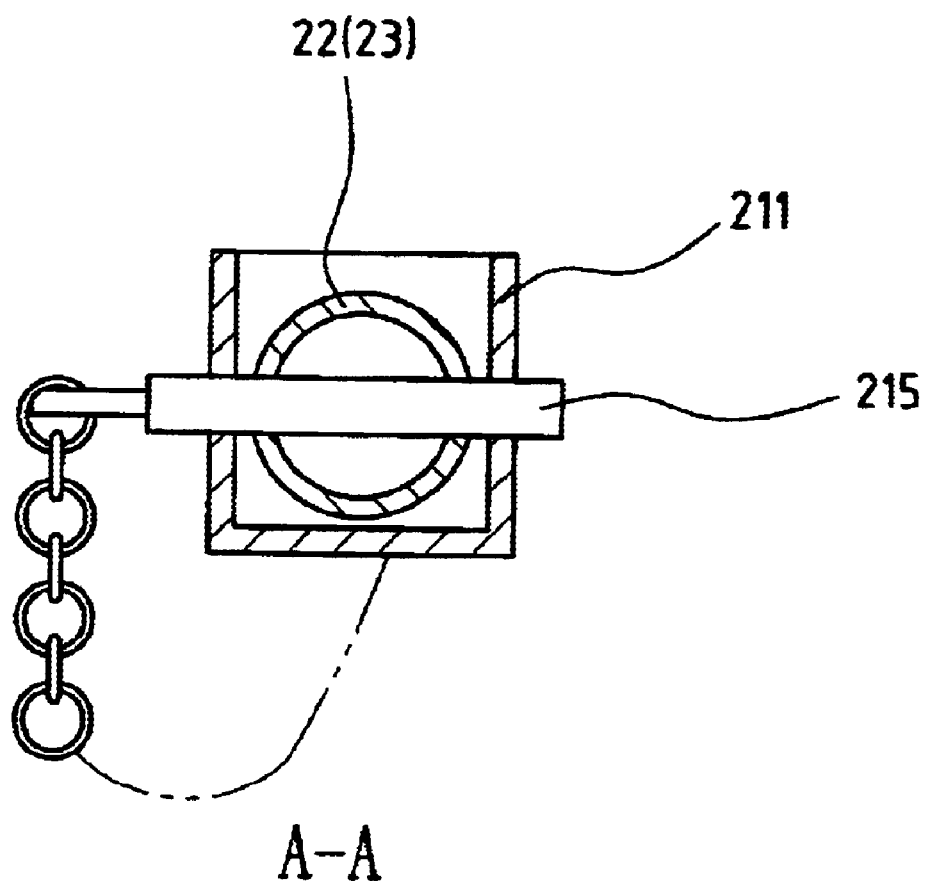
FIG. 7 shows a pin extending through the frame of the leg assembly and the a leg.

A leg assembly 20 is fixed to a lower end of the post 10 and includes a frame 21 which is welded to the first tube 11 and three U-shaped members 211 are connected to the frame 21. Each U-shaped member 211 has a fixing hole 213 and a pivoting hole 212 defined through each of two sidewalls thereof. Three legs 22, 23 are respectively engaged with the three U-shaped members 211 by extending a screw 214 through the pivoting holes 212 of each of the three U-shaped members 211 and a pivoting hole 231 of each of the three legs 22, 23 so that the three legs 22, 23 can be pivoted relative to the screws 214. Farther referring to FIG. 7, a pin 215 extends through the fixing holes 213 of each of the three U-shaped members 211 and a fixing bole 232 of each of the three legs 22, 23 when the three legs 22, 23 are expanded horizontally. The leg 23 is a shot leg and the other two legs 22 are long legs. The short leg 23 is arranged to be put close to the wall so as to occupy less space. Each of the three legs 22, 23 has a bending portion which contacts the floor.

Figure 4:
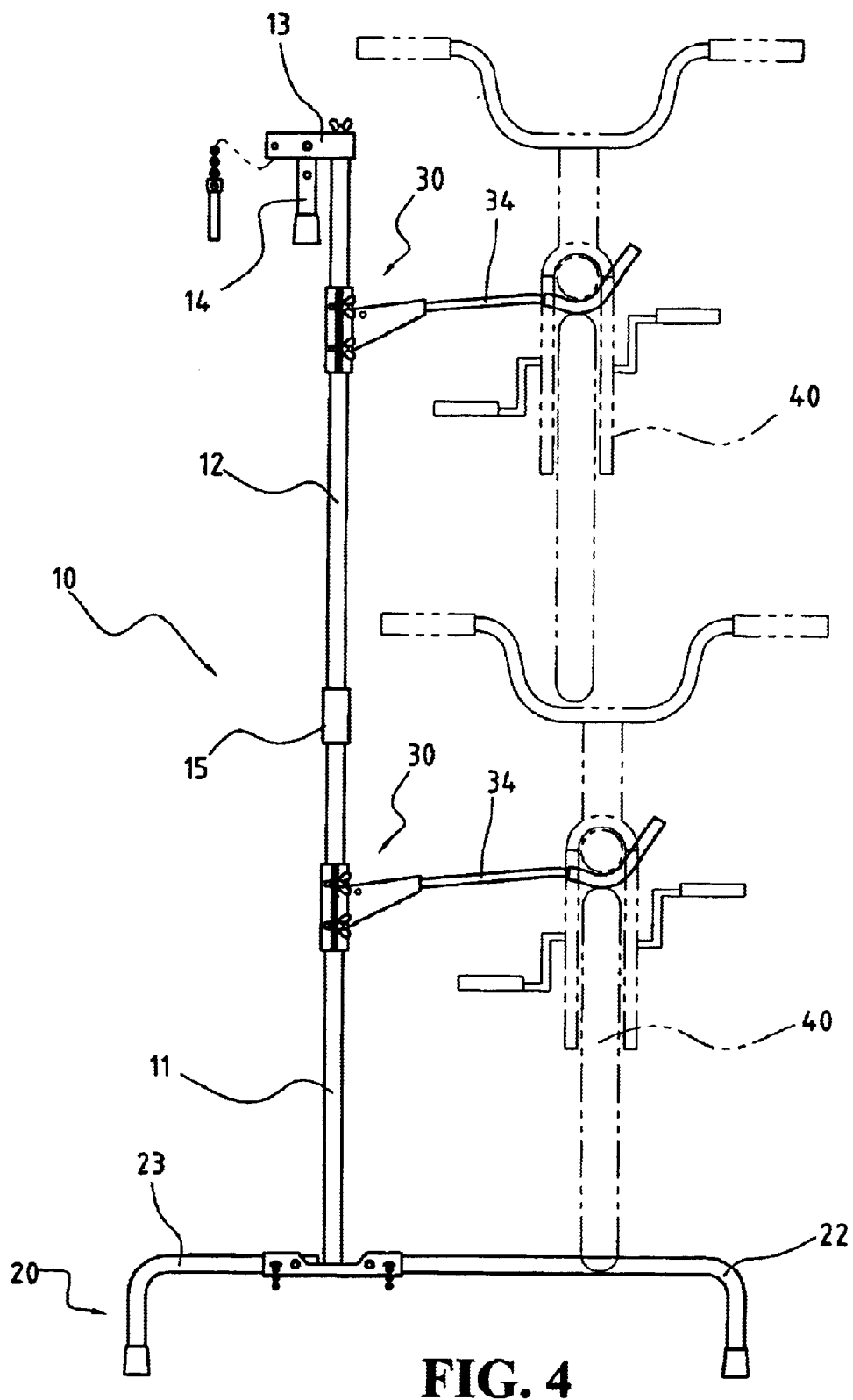
FIG. 4 shows two bicycles are hanged on the hanging device of the present invention.

Two sets of support rod assembly 30 are fixed to the post 10 and each set includes a first fixing plate 31 and a second fixing plate 35. The post 10 is clamped between the first fixing plate 31 and the second fixing plate 35 by using screws to connect the first fixing plate 31 and the second fixing plate 35. Two support members 32 are connected to the first fixing plate 31 of each set of support rod assembly 30 and two support rods 34 are pivotably connected to the two support members 32 about the position 33. Each of the support rods 34 includes a hooked distal end so that the bicycle frame 40 can be hanged on the hook distal ends as shown in FIG. 4. The weight center of the bicycles 40 is located between the range of the bending portions of the legs 22 and the post 10 so that the hanging device will not fall. The bicycles 40 are hanged in an upright direction so that the space that occupied by the device and the bicycles 40 is efficiently reduced.

Figure 5:
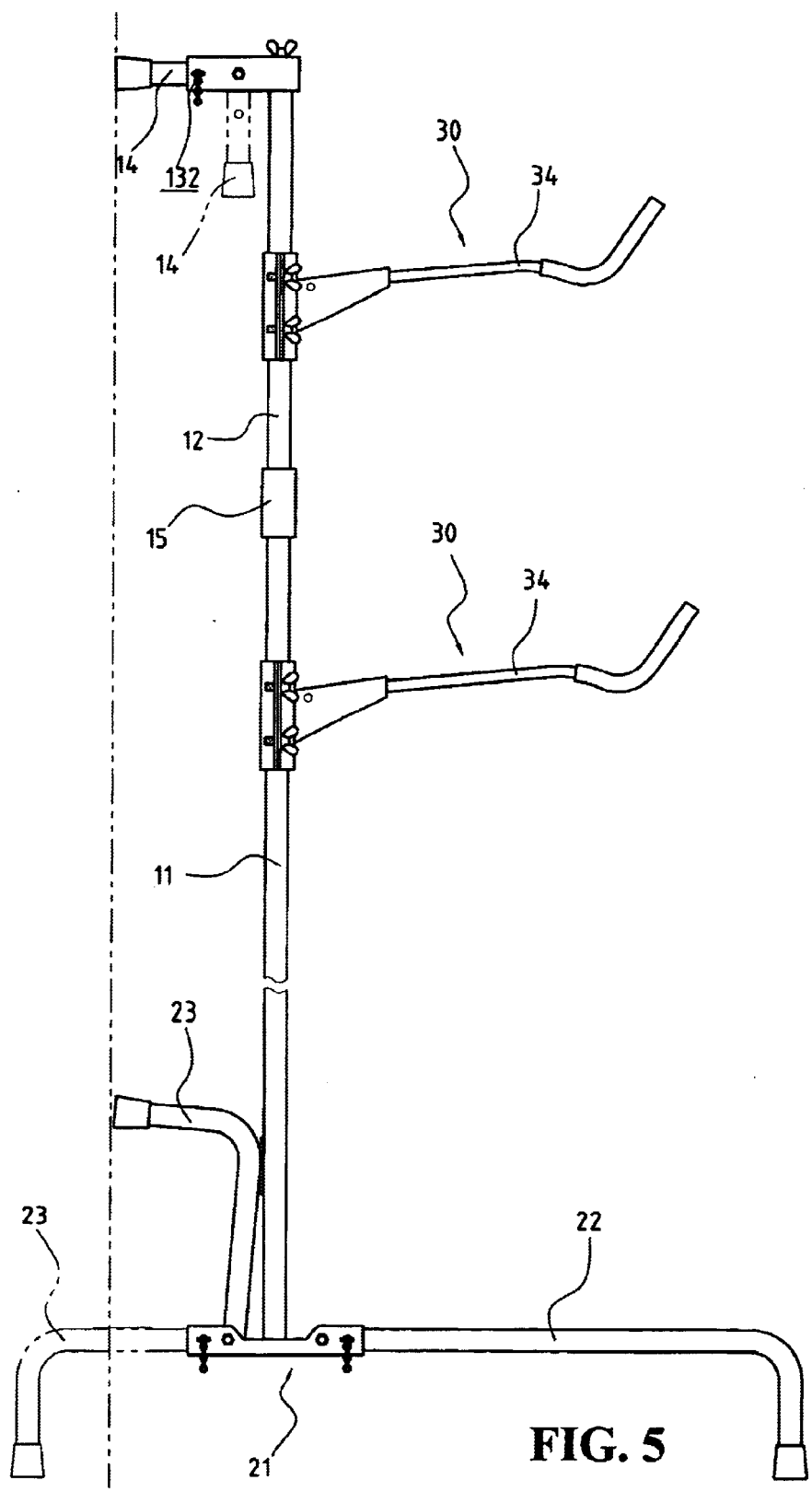
FIG. 5 shows the short leg and the auxiliary rod of the hanging device are used to contact a wall.

An auxiliary rod 14 is pivotably connected to a positioning member 13 which is fixed to the top of the post 10. A pivoting hole 131 and a fixing hole 132 are defined through each of two sidewalls of the positioning member 13. The auxiliary rod 14 is received between the two sidewalls of the positioning member 13 by extending a screw through the pivoting holes 131 of the positioning member 13 and a hole 141 defined through the auxiliary rod 14. A pin 133 may extend through the fixing holes 132 of the positioning member 13 and a hole 142 defined through the auxiliary rod 14 when the auxiliary rod 14 is positioned at a horizontal position as shown in FIG. 5 which illustrates another way to use the hanging device, wherein the short leg 23 is also pivoted to let the bending portion of the short leg 23 contact the wall. By this arrangement, the distance between the wall and the post 10 is further reduced.

Figure 6:
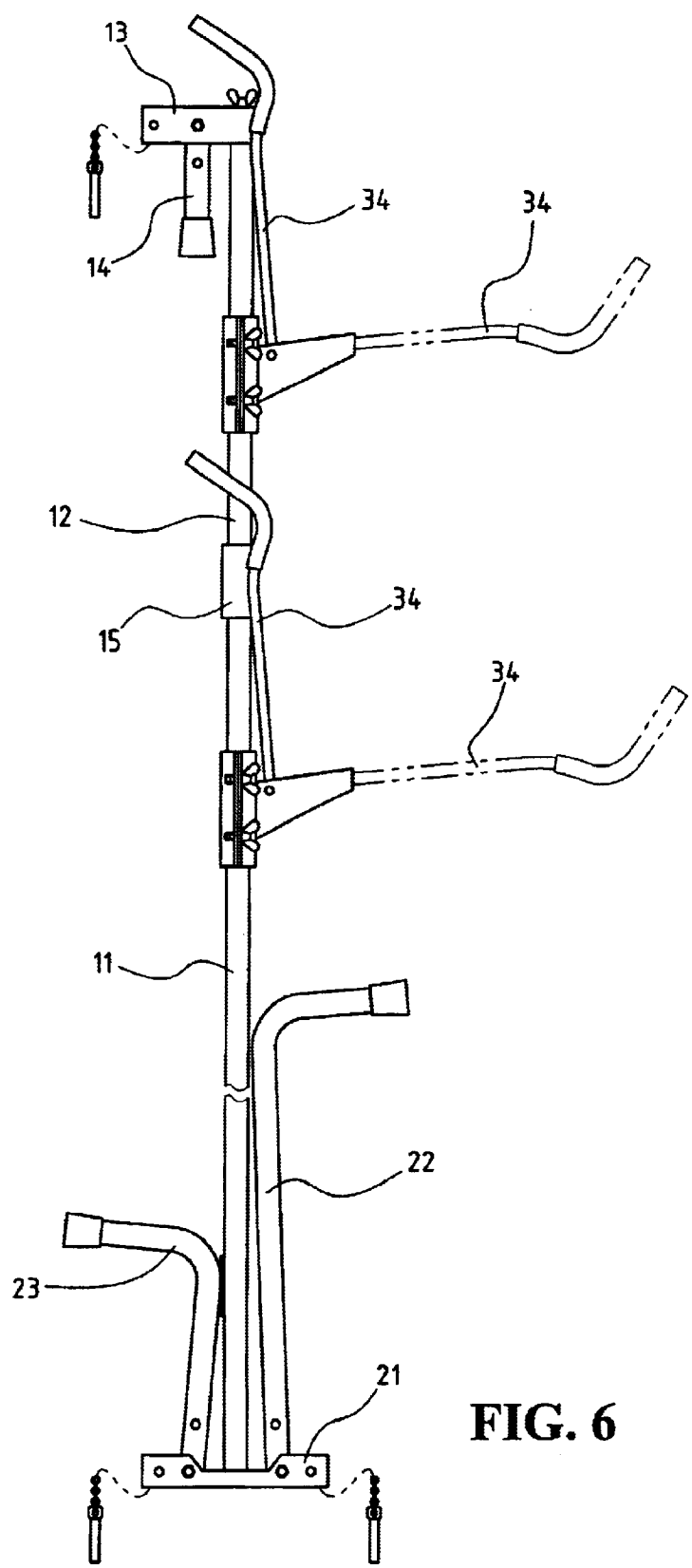
FIG. 6 shows the hanging device of the present invention is folded.

The hanging device can be conveniently folded to a compact size as shown in FIG. 6 which occupies only a small area and is suitable to smaller interior of rooms.

While we have shown and described the embodiment in accordance with the present invention, it should be clear to those skilled in the art that further embodiments may be made without departing from the scope of the present invention.

What is claimed is:

1. A hanging device comprising:

a post;

a leg assembly fixed to a lower end of the post, said leg assembly having a frame, at least three U-shaped members connected to said frame, and at least three legs each having a bending portion, a fixing hole and a pivoting hole with one leg being shorter than the other two legs, each U-shaped member having two side walls each being formed with a fixing hole and a pivoting hole; and at least one set of support rod assembly fixed to said post, said support rod assembly having at least one support rod pivotably connected thereon;

wherein each of said at least three legs is respectively engaged with one of said at least three U-shaped members by having a screw extending through said pivoting hole of a leg and said pivoting holes of a U-shaped member, and a pin extending through said fixing hole of a leg and said fixing holes of a U-shaped member when said at least three legs are positioned horizontally.

2. The hanging device as claimed in claim 1, wherein said post farther includes a first tube, a control collar connected to said first tube, and a second tube retractably received in said first tube through said control collar.

3. The hanging device as claimed in claim 1, wherein said frame is welded to said post.

4. The hanging device as claimed in claim 1, wherein said at least one support rod has a hooked distal end.

5. A hanging device comprising:

a post;

a leg assembly fixed to a lower end of the post, said leg assembly having a frame, at least three U-shaped members connected to said frame, and at least three legs each having a bending portion with one leg being shorter than the other two legs; and at least one set of support rod assembly fixed to said post, said support rod assembly having a first fixing plate, a second fixing plate, and at least one support rod pivotably connected to a support member mounted on said first fixing plate;

wherein said post is clamped between said first and second fixing plates.

6. The hanging device as claimed in claim 5, wherein said post further includes a first tube, a control collar connected to said first tube, and a second tube retractably received in said first tube through said control collar.

7. The hanging device as claimed in claim 5, wherein said frame is welded to said post.

8. The hanging device as claimed in claim 5, wherein said at least one support rod has a hooked distal end.

9. A hanging device comprising:

a post;

a leg assembly fixed to a lower end of the post, said leg assembly having a frame, at least three U-shaped members connected to said frame, and at least three legs each having a bending portion with one leg being shorter than the other two legs;

at least one set of support rod assembly fixed to said post said support rod assembly having at least one support rod pivotably connected thereon; and an auxiliary rod pivotably connected to a top of said post, said auxiliary rod being adjustable to a horizontal position.

10. The hanging device as claimed in claim 9, further comprising:

a positioning member fixed to said top of said post, said positioning member having two side wails each being formed with a fixing hole and a pivoting hole;

wherein said auxiliary rod is formed with a pivoting hole and a fixing hole, and said auxiliary rod is pivotally connected to said positioning member by having a screw extending through said pivoting holes of said positioning member and said pivoting hole of said auxiliary rod, any a pin extending through said fixing holes of said positioning member and said fixing hole of said auxiliary rod when said auxiliary rod is positioned horizontally.

11. The hanging device as claimed in claim 9, wherein said post further includes a first tube, a control collar connected to said first tube, and a second tube retractably received in said first tube through said control collar.

12. The hanging device as claimed in claim 9, wherein said frame is welded to said post.

13. The hanging device as claimed in claim 9, wherein said at least one support rod has a hooked distal end.

* * * * *